United States Patent
Nakajima et al.

(10) Patent No.: US 6,328,671 B1
(45) Date of Patent: Dec. 11, 2001

(54) DRIVE FORCE CONTROL DEVICE

(75) Inventors: Yuki Nakajima, Yokohama; Shusaku Katakura; Masaaki Uchida, both of Yokosuka, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/572,436

(22) Filed: May 17, 2000

Related U.S. Application Data

(63) Continuation-in-part of application No. 09/271,337, filed on Mar. 18, 1999, now Pat. No. 6,090,007.

(30) Foreign Application Priority Data

Mar. 20, 1998 (JP) ..................................................... 10-72409
Mar. 15, 1999 (JP) ..................................................... 11-63834

(51) Int. Cl.[7] ................................................. B60K 41/12
(52) U.S. Cl. ................................ 477/46; 477/3; 477/15; 180/65.4
(58) Field of Search .......................... 477/2, 3, 15, 44, 477/46; 180/65.2, 65.3, 65.4, 65.5, 65.6

(56) References Cited

U.S. PATENT DOCUMENTS

| | | | |
|---|---|---|---|
| 5,789,881 | 8/1998 | Egami et al. | 180/65.4 X |
| 5,846,155 | 12/1998 | Taniguchi et al. | 477/2 |
| 5,873,426 | 2/1999 | Tabata et al. | 477/2 X |
| 5,939,848 | 8/1999 | Yano et al. | 180/65.4 X |
| 5,959,420 | 9/1999 | Boberg et al. | 318/432 |
| 6,166,499 | * 12/2000 | Kanamori et al. | 180/65.4 X |

FOREIGN PATENT DOCUMENTS

| | | | |
|---|---|---|---|
| 3338548 | * 5/1985 | (DE) | . |
| 4124479 | * 1/1993 | (DE) | . |
| 410448 | 1/1991 | (EP) | . |
| 743208 | * 11/1996 | (EP) | . |
| 0 781 680 | 7/1997 | (EP) | . |
| 0 788 914 | 8/1997 | (EP) | . |
| 62-110536 | 5/1987 | (JP) | . |
| 8-251708 | 9/1996 | (JP) | . |

* cited by examiner

*Primary Examiner*—Charles A Marmor
*Assistant Examiner*—Ha Ho
(74) *Attorney, Agent, or Firm*—Foley & Lardner

(57) ABSTRACT

In a hybrid vehicle wherein the rotation torques of a motor and engine are input to a continuously variable transmission, a drive force is controlled by a microprocessor programmed to set a target drive power ($t_{PO}$) based on a depression amount of an accelerator pedal (APO) and a vehicle speed (VSP), set a battery power (PB) based on a battery charge amount (SOC), set a target engine power ($t_{PE}$) based on the target drive power ($t_{PO}$) and the battery power (PB). The microprocessor is also programmed to set a limited target engine power ($t_{PELMT}$) to zero when the target engine power ($t_{PE}$) is less than a predetermined value, and set the limited target engine power ($t_{PELMT}$) equal to the target engine power ($t_{PE}$) when the target engine power ($t_{PE}$) is larger than the predetermined value. The microprocessor is further programmed to set a target engine torque ($t_{TE}$) and a target engine rotation speed ($t_{NE}$) based on the limited target engine power ($t_{PELMT}$), set the target motor/generator torque ($t_{TMG}$) based on a target motor/generator power ($t_{PMG}$) and the input rotation speed (NI), and set the target speed ratio ($t_{RVO}$) based on the target engine rotation speed (NI) and the vehicle speed (VSP).

3 Claims, 9 Drawing Sheets

DRIVE FORCE CONTROL DEVICE

This is a continuation-in-part of application Ser. No. 09/271,337, filed on Mar. 18, 1999 now U.S. Pat. No 6,090,007.

FIELD OF THE INVENTION

This invention relates to a drive torque control of a so-called parallel hybrid vehicle which transmits the power of an engine and a motor/generator to drive wheels via a continuously variable transmission.

BACKGROUND OF THE INVENTION

Tokkai Hei 8-251708 published by the Japanese Patent Office in 1996 discloses a parallel hybrid drive system for a vehicle wherein an engine and motor/generator are connected to drive wheels via a V-belt continuously variable transmission.

A motor/generator is a device equipped with the functions of both a motor and a generator so that a rotor is rotated according to the energizing of the coil of a stator, and the coil of the stator generates a current according to the rotation input to the rotor.

Tokkai Sho 62-110536 published by the Japanese Patent Office in 1987 discloses a drive force controller for a vehicle equipped with an electronic throttle and a continuously variable transmission. A target vehicle drive torque is calculated based on the depression amount of an accelerator pedal and the vehicle speed, and a target rotation speed of the input shaft of the continuously variable transmission is calculated from the target vehicle drive torque and vehicle speed, and a target speed ratio of the continuously variable transmission is set to achieve the target rotation speed. Also, a target engine torque is calculated from the target speed ratio and target vehicle drive torque. The speed ratio of the continuously variable transmission is controlled to the target speed ratio, and the degree of opening of the electronic throttle is controlled to obtain the target engine torque. The torque required by a driver is thereby obtained.

SUMMARY OF THE INVENTION

In the above-mentioned hybrid drive system, the proportion of the output torque of the engine and motor/generator varies depending on the running state. For this reason, the above-mentioned drive force controller is not applicable to the hybrid drive system.

It is therefore an object of this invention to correctly control the drive force of a parallel hybrid vehicle which transmits the drive torque of the engine and motor/generator to the drive wheels via the continuously variable transmission.

In order to achieve the above object, this invention provides a drive force control device for such a hybrid vehicle that has an engine which is controlled to reach a target engine torque ($t_{TE}$), a motor/generator which is controlled to reach a target motor/generator torque ($t_{TMG}$) and which is connected to a battery, and a continuously variable transmission which is controlled to reach a target speed ratio ($t_{RI/O}$) and which is connected to the engine and the motor/generator.

The device comprises a sensor for detecting a depression amount (APO) of an accelerator pedal, a sensor for detecting a vehicle speed (VSP), a sensor for detecting an input rotation speed (NI) of the continuously variable transmission, a sensor for detecting a battery charge amount (SOC) of the battery, and a microprocessor.

The microprocessor is programmed to set a target drive power ($t_{PO}$) based on the depression amount of the accelerator pedal (APO) and the vehicle speed (VSP), set a battery power (PB) based on the battery charge amount (SOC), set a target engine power ($t_{PE}$) based on the target drive power ($t_{PO}$) and the battery power (PB), set a limited target engine power ($t_{PELMT}$) to zero when the target engine power ($t_{PE}$) is less than a predetermined value, and set the limited target engine power ($t_{PELMT}$) equal to the target engine power ($t_{PE}$) when the target engine power ($t_{PE}$) is larger than the predetermined value, set the target engine torque ($t_{TE}$) and a target engine rotation speed ($t_{NE}$) based on the limited target engine power ($t_{PELMT}$), set the target motor/generator torque ($t_{TMG}$) based on a target motor/generator power ($t_{PMG}$) and the input rotation speed (NI), and set the target speed ratio ($t_{RI/O}$) based on the target engine rotation speed (NI) and the vehicle speed (VSP).

The details as well as other features and advantages of this invention are set forth in the remainder of the specification and are shown in the accompanying drawings.

DESCRIPTION OF THE PREFERRED EMBODIMENTS

Figure 1:
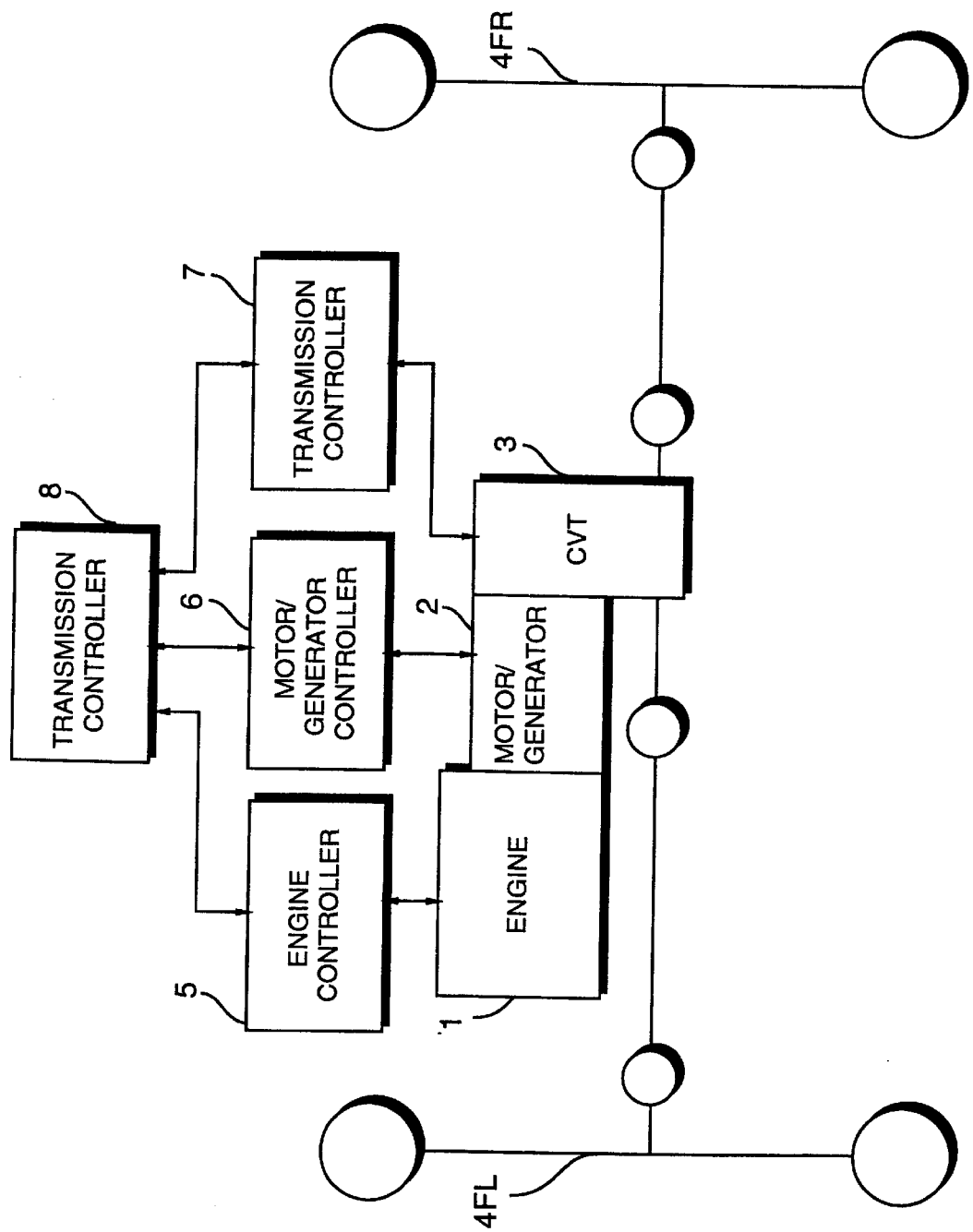
FIG. 1 is a schematic diagram of a drive force control device according to this invention.
Figure 2:
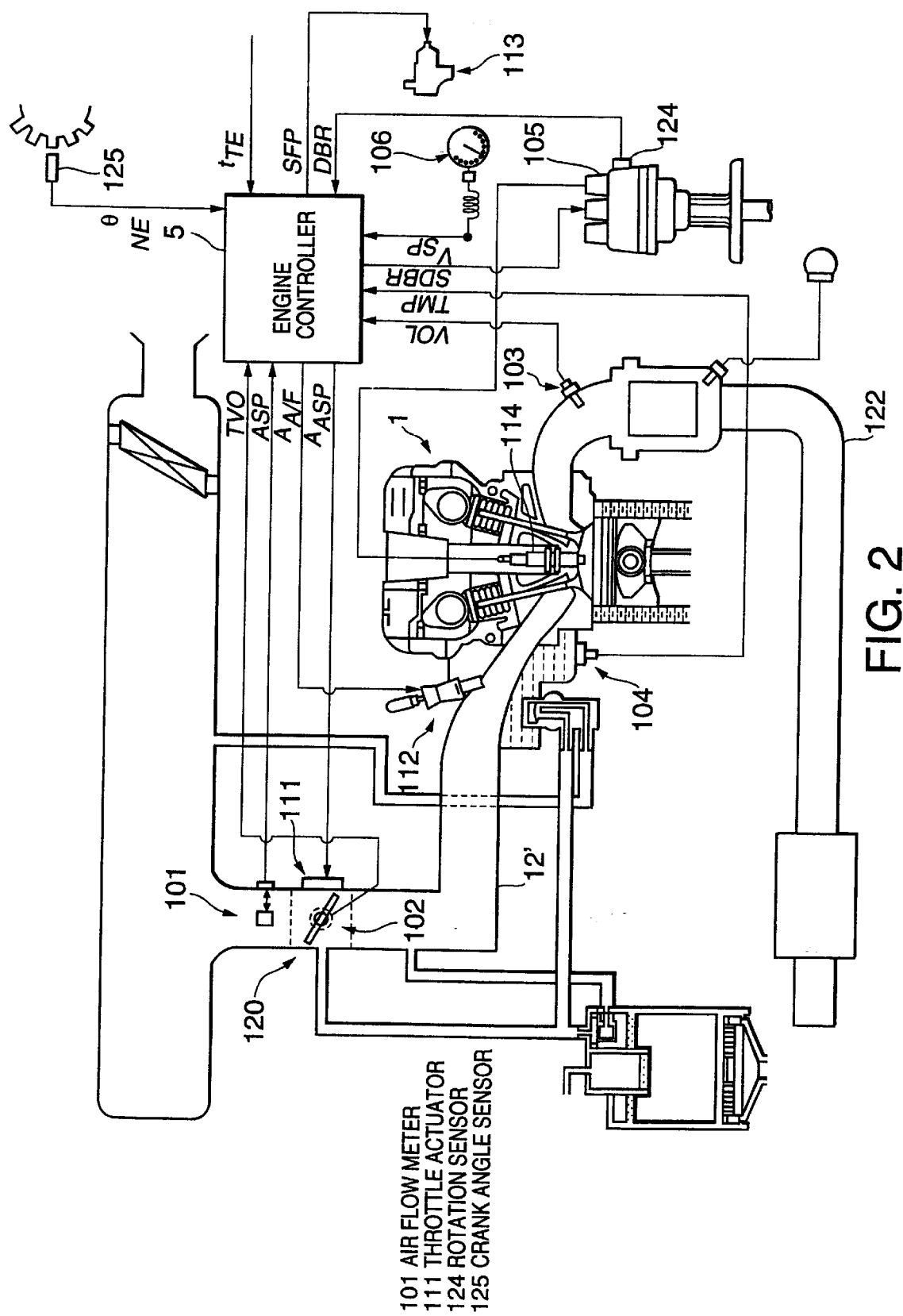
FIG. 2 is a schematic diagram of an engine controller according to this invention.
Figure 3:
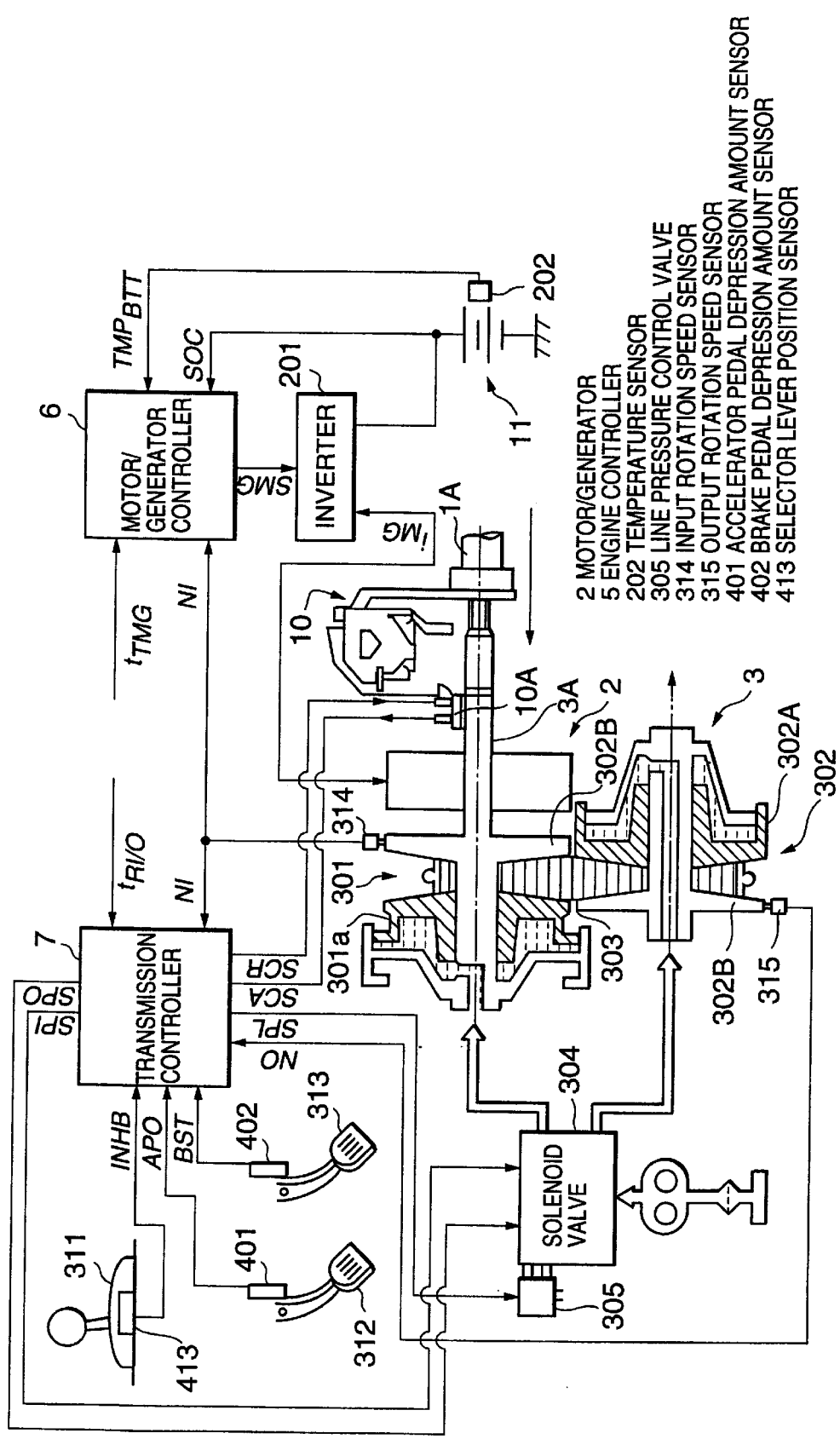
FIG. 3 is a schematic diagram of a motor/generator controller and a speed change contoller according to this invention.

Referring to FIGS. 1–11 of the drawings, the output shaft of an engine 1 and the rotation shaft of a motor/generator 2 are connected in series to an input shaft of a continuously variable transmission (CVT) 3 via an electromagnetic powder clutch 10 shown in FIG. 3, and the final output shaft of the continuously variable transmission 3 is connected to front wheels 4FL, 4FR.

The engine 1 varies its output according to the output signal of an engine controller 5. The motor/generator 2 varies its output according to an output signal of a motor/generator controller 6.

The continuously variable transmission 3 varies its speed ratio according to an output signal of a transmission controller 7. Herein, a speed ratio is defined as input shaft rotation speed/output shaft rotation speed of the continuously variable transmission 3.

In order to give control target values to each of these controllers, respectively, the drive force control device of this invention is provided with a target value setting controller 8.

The target value setting controller 8 outputs a target engine torque $t_{TE}$ to the engine controller 5, outputs a target motor/generator torque $t_{TMG}$ to the motor/generator controller 6, and outputs a target speed ratio $t_{RI/O}$ to the transmission controller 7. The controllers 5 and 6 and 7 control each device according to the corresponding input target value.

Next, referring to FIG. 2, the engine 1 is a multi-cylinder water-cooled gasoline engine. The engine 1 is provided with an intake pipe 121 which aspirates air, exhaust pipe 122 which discharges exhaust gas, electronic throttle 120 provided in the intake pipe 121, fuel injector 112 which injects a fuel into the intake air, fuel feed pump 113 which supplies fuel to the fuel injector 112, spark plug 114 which ignites an air-fuel mixture, and a distributor 123 which supplies a firing current to the spark plug 114. The electronic throttle 120 varies a degree of its opening by a throttle actuator 111 which responds to a signal from the engine controller 5. This degree of opening, i.e. the throttle opening, basically corresponds to a depression amount of the accelerator pedal 312 shown in FIG. 3, but the engine controller 5 increases or decreases the throttle opening independently of the depression amount of the accelerator pedal 312 according to demand.

Signals are input to the engine controller 5 from an air flow meter 101 which detects an intake air flowrate ASP of the intake pipe 121, throttle sensor 102 which detects a throttle opening TVO of the electronic throttle 102, oxygen sensor 103 which detects an oxygen concentration VOL, water temperature sensor 104 which detects a cooling water temperature TMP of the engine 1, rotation sensor 124 which detects a rotation speed of the distributor 105, vehicle speed sensor 106 which detects a vehicle speed VSP, and a crank angle sensor 125 which detects an engine rotation angle θ and rotation speed NE of the engine 1. A target engine torque is also input as a signal from the above-mentioned target value setting controller 8.

The engine controller 5 calculates a fuel injection amount based on the intake air flowrate ASP, cooling water temperature TMP, engine rotation speed NE, and engine rotation angle θ. Moreover, an ignition timing of the spark plug 114 is calculated based on the engine load represented by the throttle opening TVO and the engine rotation speed NE.

An air-fuel ratio signal $A_{A/F}$ is output to the fuel injector 112, a corresponding pump control signal SFP is output to the fuel pump 113, and an ignition timing signal SDBR is output to the distributor 105 so that the calculated fuel injection amount and ignition are attained. Moreover, an intake air flowrate signal $A_{ASP}$ is output to the throttle actuator 111 so that the target engine torque input from the target value setting controller 8 is achieved.

If a diesel engine is used instead of the gasoline engine 1, the torque may be controlled by controlling the fuel injection amount, for the reason that the output torque of the diesel engine is proportional to the fuel injection amount.

Next, referring to FIG. 3, the continuously variable transmission 3 is a V-belt continuously variable transmission wherein a belt 303 is wound on a drive pulley 301 and a driven pulley 302.

The drive pulley 301 is provided with a movable wheel 301A and fixed wheel 301B. The driven pulley 302 is provided with a movable wheel 302A and fixed wheel 302B.

When the movable wheels 301A and 302A are displaced in an axial direction, the contact radii of the belt 303 and pulleys 301, 302 vary, and the speed ratio varies as a result. These are supported by an oil pressure supplied via a solenoid valve 304. Line pressure is supplied to the solenoid valve 304 from an oil pump, not shown, via a line pressure control valve 305. The solenoid valve 304 adjusts this line pressure, and supplies it to the movable wheels 301A and 302A.

An input shaft 3A of continuously variable transmission 3 is connected to the drive pulley 301. The other end of the input shaft 3A is connected to an output shaft 1A of the engine 1 via the electromagnetic powder clutch 10. One of the roles of the electromagnetic powder clutch 10 is to intercept the engine 1 and the continuously variable transmission 3 to enable the stopping of the engine 1 when the torque of the engine 1 is not required. The electromagnetic powder clutch 10 is connected to the transmission controller 7 via a slip ring 10A, and its tightening force is varied according to an engaging force signal SCA from the transmission controller 7. At the same time, the present engaging force is output to the transmission controller 7 as an engaging force signal SCR.

Signals to the transmission controller 7 are input from a selector lever position sensor 413 which detects a selection range INHB of a selector lever 311, an accelerator pedal depression amount sensor 401 which detects an operating amount APO of an accelerator pedal 312, a brake pedal depression amount sensor 402 which detects a depression amount BST of a brake pedal 313, an input rotation speed sensor 314 which detects an input rotation speed NI of the continuously variable transmission 3, and an output rotation speed sensor 315 which detects an output rotation speed NO of the continuously variable transmission 3.

The input rotation speed of the continuously variable transmission 3 is equivalent to the rotation speed of the drive pulley 301, and the output rotation speed of the continuously variable transmission 3 is equivalent to the rotation speed of the driven pulley 302.

The transmission controller 7 calculates a real speed ratio $R_{I/O}$ which is the ratio of the input shaft rotation speed NO and the power output rotation speed NI from these input signals, and determines the fluid pressure supplied to the movable wheels 301A, 302A so that the real speed ratio coincides with the target speed ratio $t_{RI/O}$ input from the target value setting controller 8. Corresponding signals SPI, SPO are output to a solenoid valve 304. Further, a line pressure signal SPL is output to the line pressure control valve 305, and the clutch engaging force signal SCA is output to the electromagnetic powder clutch 10.

It is also possible to use a torque converter instead of the electromagnetic powder clutch 10. The control of the transmission controller 7 in this case will be described later.

Moreover, the output rotation speed NO of the output rotation speed sensor 315 may also be used as the above-mentioned vehicle speed VSP by multiplying it by a predetermined coefficient.

The motor/generator 2 is directly linked with the input shaft 3A of the continuously variable transmission 3. The motor/generator 2 has the function of a motor and a generator and is connected to a battery 11 via an inverter 201.

Signals are input to the motor/generator controller 6 from the input rotation sensor 314 and a temperature sensor 202 which detects a battery temperature TMPBTT of the battery 11. A signal showing the charge amount SOC is input to the motor/generator controller 6 from the battery 11. A target motor/generator torque tTMG is also input to the motor/generator controller 6 from the target value setting controller 8.

The motor/generator controller 6 outputs a motor/generator control signal SMG to the inverter 201 based on these input signals. The inverter 201 varies the direction and magnitude of the current $i_{MG}$ supplied to the motor/generator 2 according to this control signal SMG. When the motor/generator 2 is used for regeneration, the current $i_{MG}$ flows from the motor/generator 2 to a battery 11 via the inverter 201.

The signals input to the engine controller 5, motor/generator controller 6 and transmission controller 7, and the signals output by these controllers, are also input to the target value setting controller 8 as required.

Figure 8:
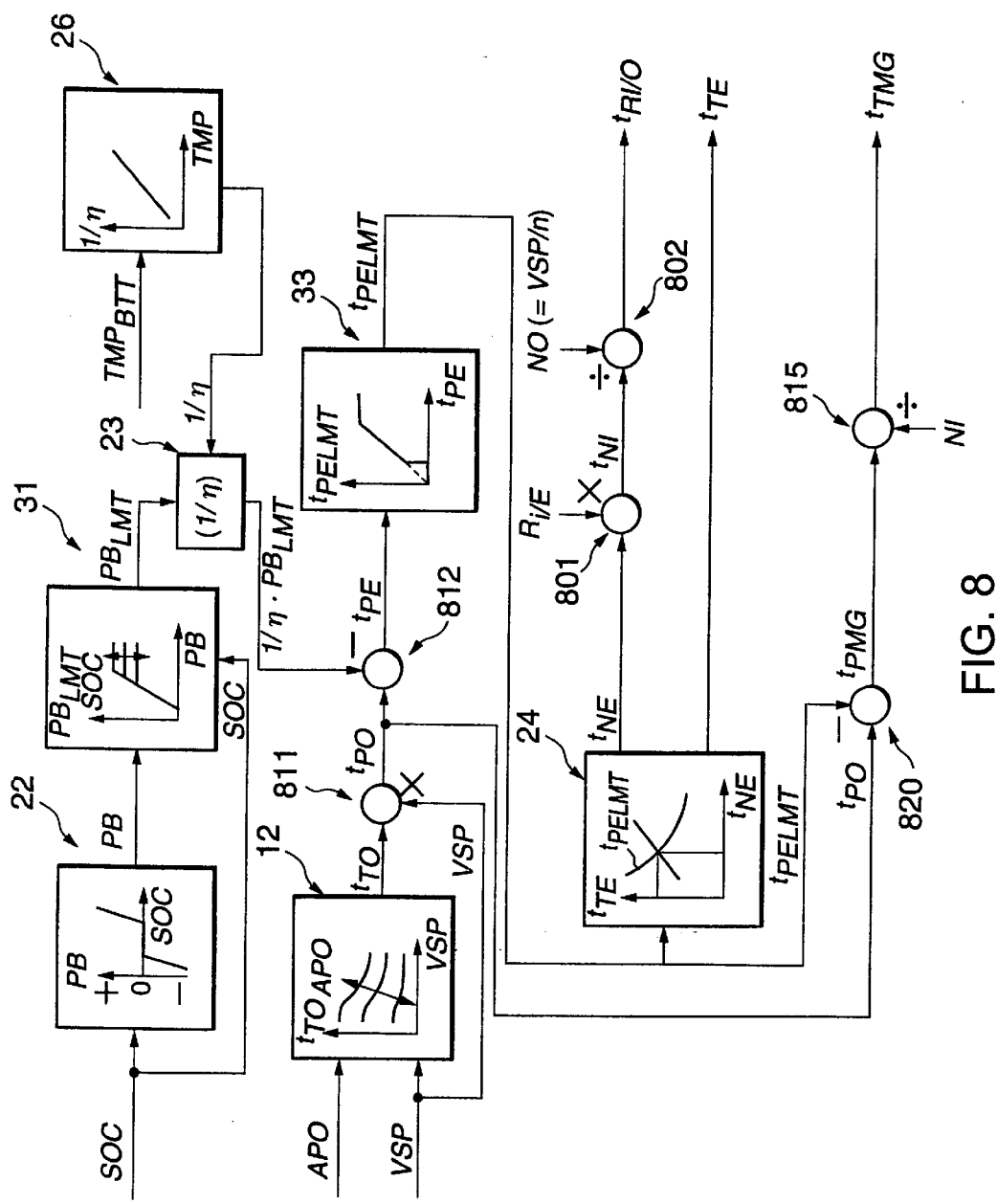
FIG. 8 is a block diagram which describes the data processing of a target speed ratio, target engine torque and target generator torque performed by a target value setting controller.
Figure 11:
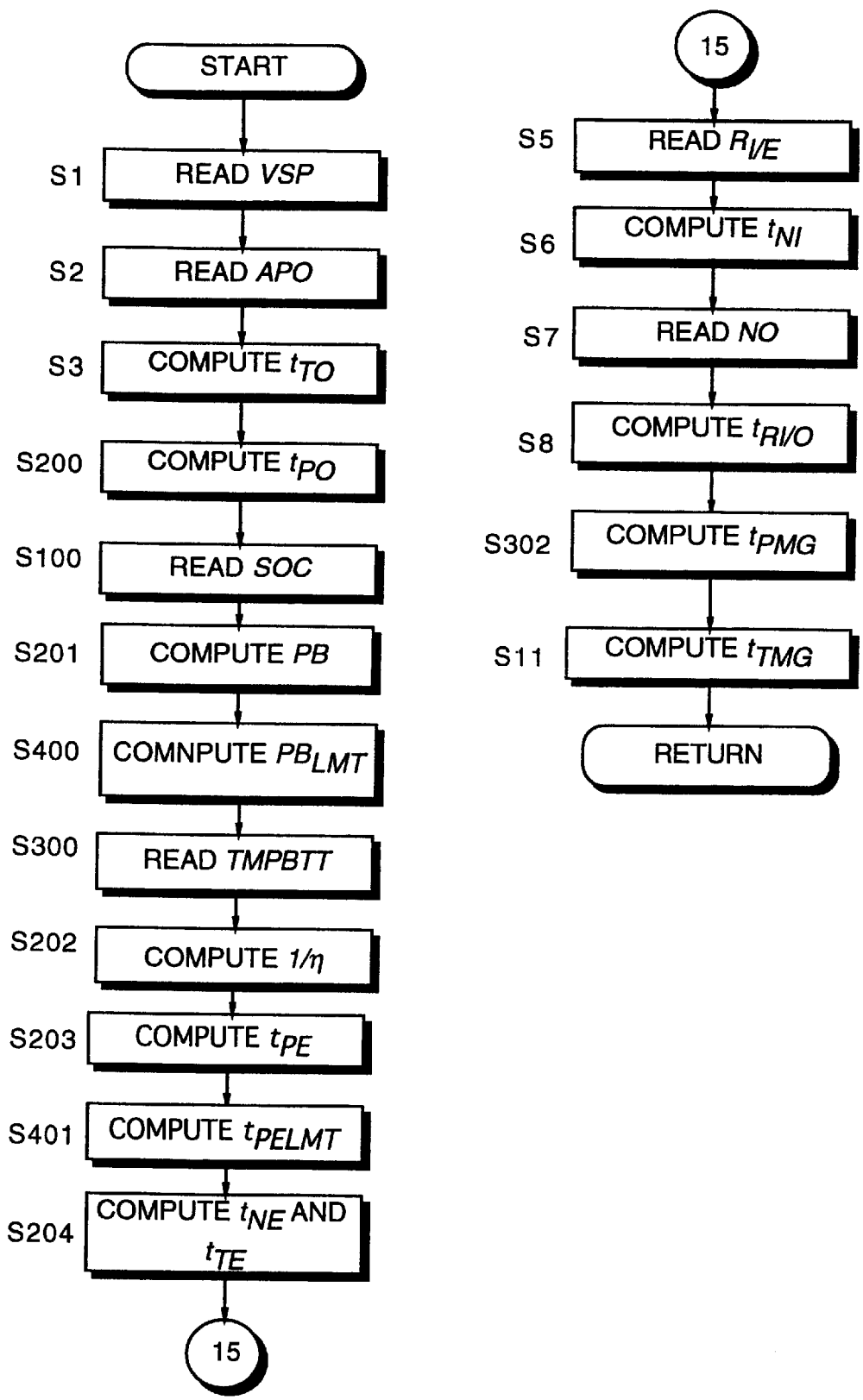
FIG. 11 is a flowchart describing a process of computing the target speed ratio, target engine torque and target motor/generator torque performed by the target value setting controller.

Next, referring to the flowchart of FIG. 11 and the block diagram of FIG. 8, the process of calculating the target speed ratio $t_{RI/O}$, target engine torque $t_{TE}$ and target motor/generator torque $t_{TMG}$ performed by the target value setting controller 8, will be described.

First, the vehicle speed VSP is read in a step S1, and the accelerator pedal depression amount APO is read in a step S2, respectively.

Figure 4:
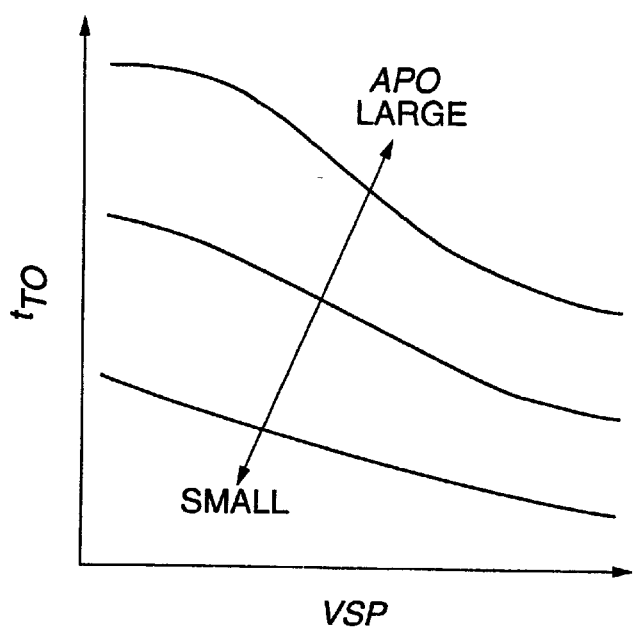
FIG. 4 is a diagram showing a map of a target drive torque stored by the target value setting controller.

In a next step S3, a target drive torque $t_{TO}$ is calculated by looking up a map shown in FIG. 4 based on the accelerator pedal depression amount APO and vehicle speed VSP. This corresponds to the process performed by a target drive torque setting unit 12 of FIG. 4.

When the accelerator pedal depression amount APO is fixed, it is considered that the vehicle acceleration requested by the driver is also fixed. In this case, since the rotation speed of the wheels is smaller the lower the vehicle speed VSP, a large drive torque is required to obtain a fixed acceleration.

When the accelerator pedal depression amount APO increases, the driver demands higher acceleration. In this case also a large drive torque is required to meet the demand. The map of FIG. 4 expresses this relation graphically, and the target drive torque $t_{TO}$ for achieving the acceleration which the driver desires is calculated by using this map. The calculated target drive torque $t_{TO}$ is equivalent to the output torque of the continuously variable transmission 3.

In a next step S200, a target drive power $t_{PO}$ is computed. This step corresponds to the processing of a multiplier 811 of FIG. 8.

Next, a battery charge amount SOC is read in a step S100.

In a next step S201, a map shown in FIG. 1 is looked up based on the battery charge amount SOC, and a battery power PB is calculated. In this map, in order to drive the motor/generator 2 as a motor when the battery charge amount SOC is large, the battery power PB is a positive value.

When the battery charge amount is small, in order to drive the motor/generator 2 as a generator, the battery power PB is a negative value. When the battery charge amount SOC is intermediate, the battery power PB is 0. This processing corresponds to the process performed by a battery power setting unit 22 of FIG. 8.

Figure 9:
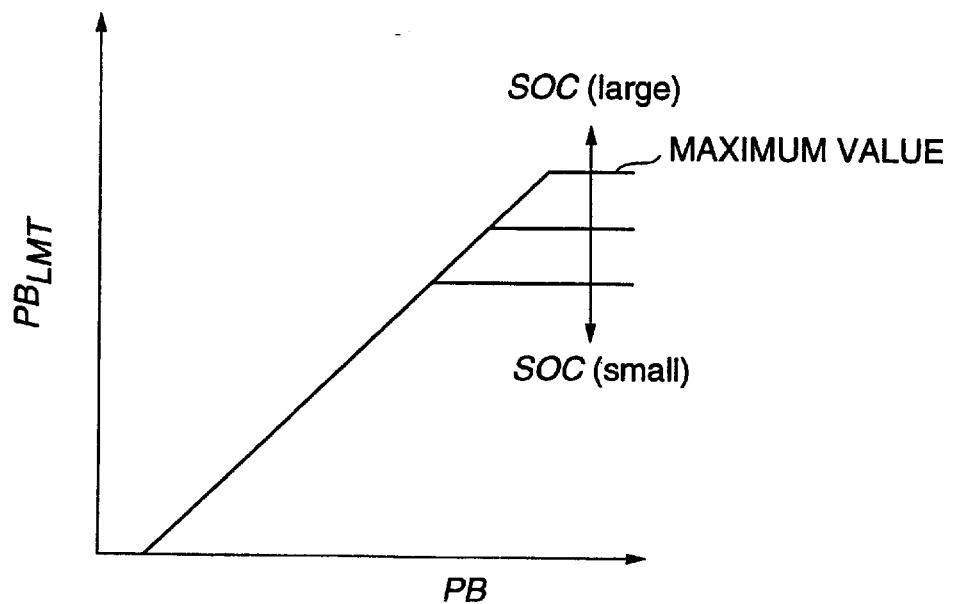
FIG. 9 is a diagram describing a map of a limited battery power stored by the target value setting controller.

In a next step S400, the battery power PB is limited by looking up a map shown in FIG. 9 based on the battery charge amount SOC. The value obtained after applying the limit is referred to as a processing value $PB_{LMT}$.

In FIG. 9, considering the region where the battery power PB is very small as a dead zone, the limited battery power $PB_{LMT}$ is set to 0. When the battery power PB increases from this dead zone, the corresponding limited battery power $PB_{LMT}$ also increases. In the region where the battery power PB is very large, the limited battery power $PB_{LMT}$ is set to a maximum value. The above process corresponds to the processing performed by a battery power limiting unit 31 of FIG. 8.

In a next step S202, a charging efficiency $1/\eta$ of the battery 11 from the motor/generator 2 via the inverter 201 is read. The charging efficiency $1/\eta$ is the inverses of an output efficiency $\eta$. This is a constant determined according to the specification of the device, and is prestored in the memory of the target value setting controller 8.

In a next step S203, the charging efficiency $1/\eta$ is multiplied by the limited battery power $PB_{LMT}$ to convert it to an engine power equivalent amount, and the engine power equivalent amount is subtracted from the target drive power $t_{PO}$ calculated in the step S200 to calculate a target engine power $t_{PE}$. This process corresponds to the processing of an efficiency multiplier 23 and a subtractor 812 of FIG. 8.

Figure 10:
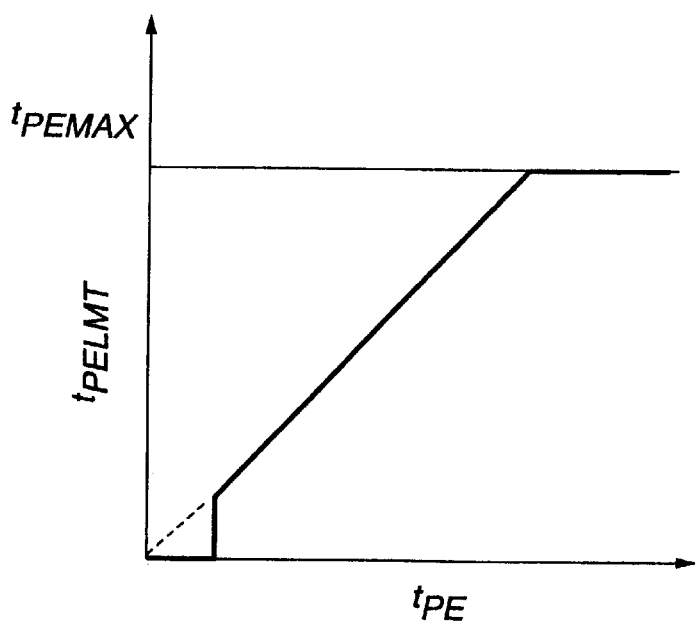
FIG. 10 is a diagram describing a map of a limited target engine power stored by the target value setting controller.

In a next step S401, a limited target engine power $t_{PELMT}$ of the target engine power $t_{TE}$, a processing value $t_{TELMT}$ of the target engine power is calculated by looking up a map shown in FIG. 10. This process corresponds to the processing performed by a target engine power limiting unit 33 of FIG. 8.

In FIG. 10, considering the region where the target engine power $t_{PE}$ is very small as a dead zone, the corresponding limited target engine power $t_{PELMT}$ is set to 0. When the target engine power $t_{PE}$ increases from this dead zone, the corresponding limited target engine power $t_{PELMT}$ is set to the target engine power $t_{PE}$. When the target engine power $t_{PE}$ exceeds a certain limit, the limited target engine power $t_{PELMT}$ reaches a maximum value $t_{PEMAX}$ and does not increase beyond this. This upper limit is equivalent to the operating limit of the engine 1.

Figure 5:
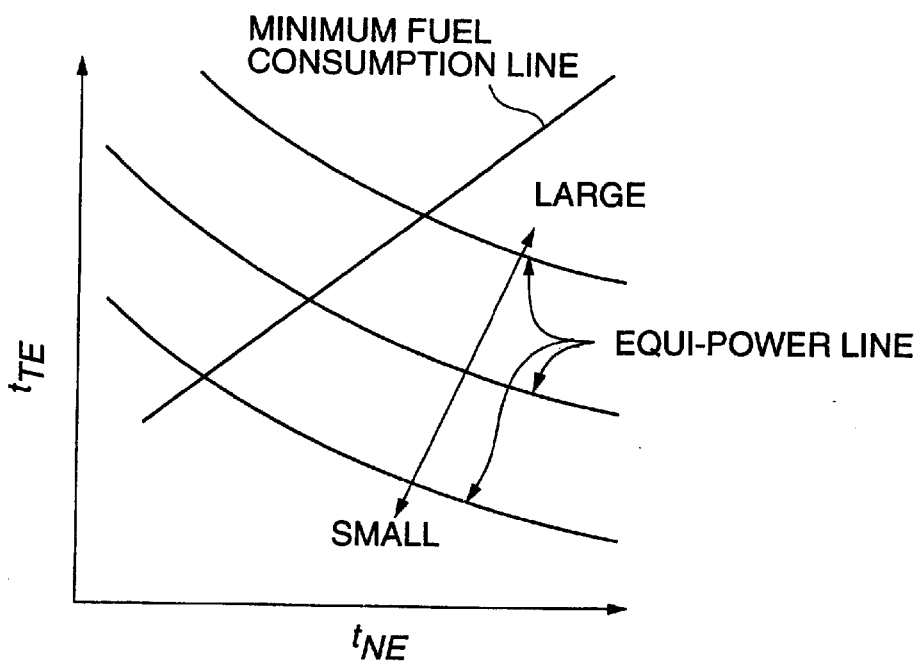
FIG. 5 is a diagram showing a map of a target engine rotation speed and a target engine torque stored by the target value setting controller.
Figure 6:
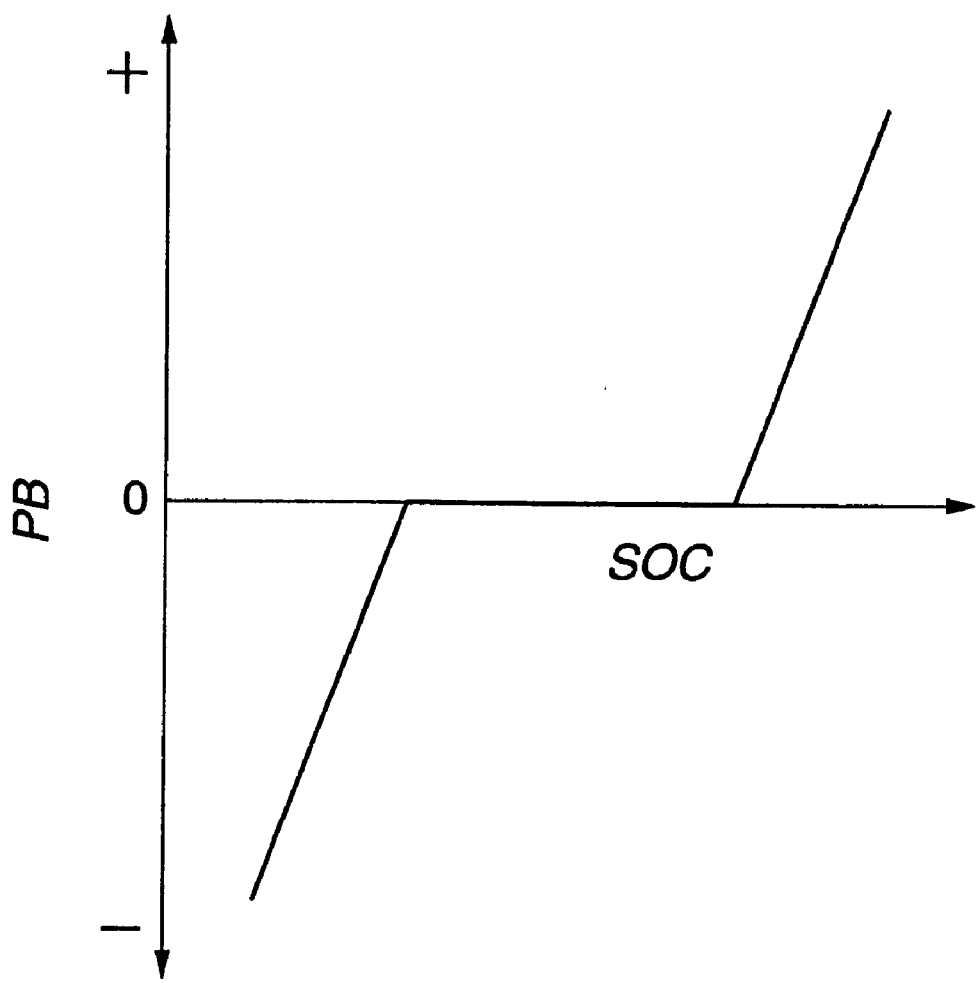
FIG. 6 is a diagram describing a map of a battery power stored by the target value setting controller.
Figure 7:
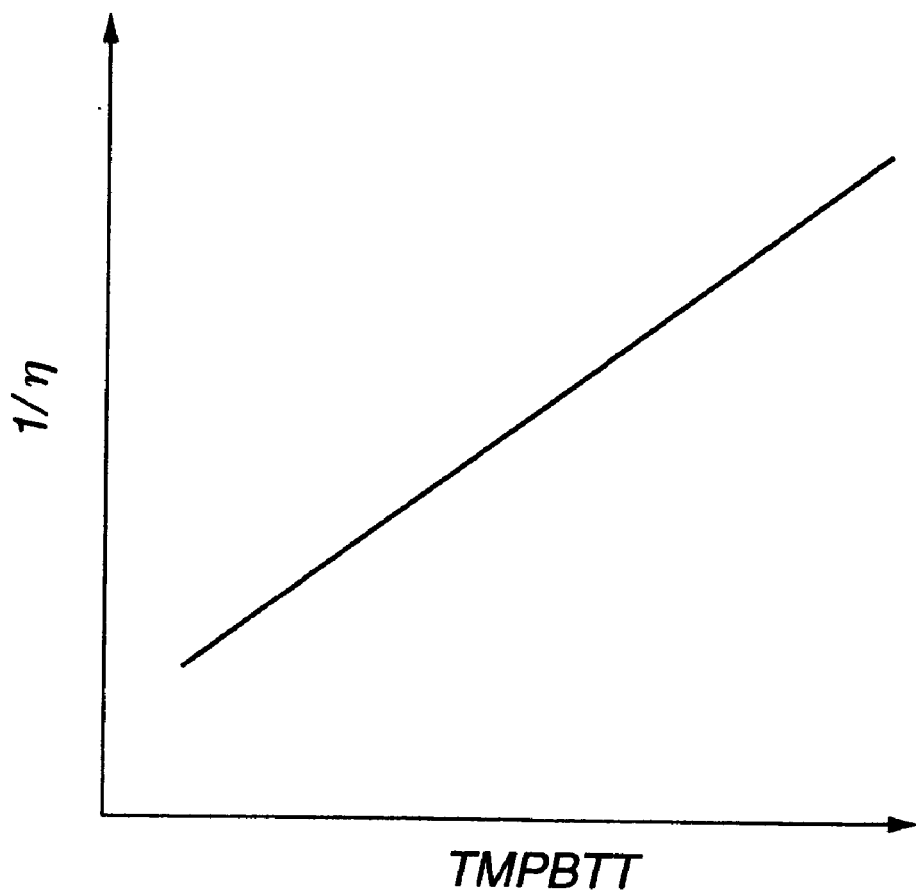
FIG. 7 is a diagram describing a map of a battery charging efficiency stored by the target value setting controller.

In a next step S204, the target engine torque $t_{TE}$ and the target engine rotation speed $t_{NE}$ are calculated from the limited target engine power $t_{PELMT}$ by looking up a map shown in FIG. 5.

Here, an equi-power line equivalent to the limited target engine power $t_{PELMT}$ is selected, and the target engine torque $t_{TE}$ and target engine rotation speed $t_{NE}$ corresponding to the intersection of the selected equi-power line and minimum fuel consumption line are read. This process corresponds to the processing of a target engine torque/rotation speed setting unit 24 of FIG. 8.

In a next step S5, the real engine rotation speed NE and the real input rotation speed NI of the continuously variable transmission 3 are read, and the ratio $R_{I/E}$ which is the ratio of these two parameters is calculated.

In a next step S6, the target engine rotation speed $t_{NE}$ calculated in the step S4 is multiplied by the ratio $R_{I/E}$ to calculate the target input rotation speed $t_{NI}$ input to the continuously variable transmission 3. This corresponds to the process performed by a multiplier 801 of FIG. 8.

In a next step S7, the real power output rotation speed NO of the continuously variable transmission 3 is read.

In a next step S8, the real power output rotation speed NO of the continuously variable transmission 3 is divided by the target input rotation speed $t_{NI}$ to calculate the target speed ratio $t_{RI/O}$ of the continuously variable transmission 3. This corresponds to the process performed by a divider 802 of FIG. 8.

In a next step S302, the motor power $t_{PMG}$ is set. This is determined by subtracting the limited target engine power $t_{PELMT}$ from the target drive power $t_{PO}$ determined in the step S200. This process corresponds to the processing performed by a subtractor 820 of FIG. 8.

In a next step S11, the motor power $t_{PMG}$ is divided by the real input rotation speed NI to determine the motor/generator torque $t_{TMG}$. This process corresponds to the processing corresponds to a divider 815 of FIG. 8.

This invention is applicable also to the drive force control of a vehicle using a motor which does not perform the regeneration operation of the motor/generator 2.

The contents of Tokugan Hei 10-72409 with a filing date of Mar. 20, 1998 in Japan, and Tokugan Hei 11-63834 with a filing date of Mar. 15, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings. For example, the controllers may be combinations of electronic circuits such as computing circuits instead of microcomputers.

The embodiments of this invention in which an exclusive property or privilege is claimed are defined as follows:

1. A drive force control device for hybrid vehicle having an engine which is controlled to reach a target engine torque ($t_{TE}$), a motor/generator which is controlled to reach a target motor/generator torque ($t_{TMG}$) and which is connected to a battery, and a continuously variable transmission which is controlled to reach a target speed ratio ($t_{RI/O}$) and which is connected to the engine and the motor/generator, comprising:

a sensor for detecting a depression amount (APO) of an accelerator pedal;

a sensor for detecting a vehicle speed (VSP);

a sensor for detecting an input rotation speed (NI) of the continuously variable transmission;

a sensor for detecting a battery charge amount (SOC) of the battery; and a microprocessor programmed to:

set a target drive power ($t_{PO}$) based on the depression amount of the accelerator pedal (APO) and the vehicle speed (VSP);

set a battery power (PB) based on the battery charge amount (SOC);

set a target engine power ($t_{PE}$) based on the target drive power ($t_{PO}$) and the battery power (PB);

set a limited target engine power ($t_{PELMT}$) to zero when the target engine power ($t_{PE}$) is less than a predetermined value, and set the limited target engine power ($t_{PELMT}$) equal to the target engine power ($t_{PE}$) when the target engine power ($t_{PE}$) is larger than the predetermined value;

set the target engine torque ($t_{TE}$) and a target engine rotation speed ($t_{NE}$) based on the limited target engine power ($t_{PELMT}$);

set the target motor/generator torque ($t_{TMG}$) based on a target motor/generator power ($t_{PMG}$) and the input rotation speed (NI); and set the target speed ratio ($t_{RI/O}$) based on the target engine rotation speed (NI and the vehicle speed (VSP).

2. A drive force control device as defined in claim 1, wherein the microprocessor is further programmed to set the target engine power ($t_{PE}$) based on the target drive power ($t_{PO}$) and a limited battery power ($PB_{LMT}$) which is set based on the battery power (PB) and a charging efficiency of the battery ($1/\eta$).

3. A drive force control device as defined in claim 2, wherein the microprocessor is further programmed to set the charging efficiency ($1/\eta$) based on a temperature of the battery (TMPBTT).

* * * * *